Inventor:
W. Lindner

Patented May 20, 1930

1,759,755

UNITED STATES PATENT OFFICE

WALTHER LINDNER, OF DUSSELDORF-GRAFENBERG, GERMANY, ASSIGNOR TO THE FIRM HOHENZOLLERN AKTIENGESELLSCHAFT FUR LOKOMOTIVBAU, OF DUSSELDORF-GRAFENBERG, GERMANY

PNEUMATIC COUPLING

Application filed December 21, 1927, Serial No. 241,717, and in Germany December 21, 1926.

My invention relates to improvements in pneumatic friction-clutches and has for its primary object to provide a construction of clutch which will be capable of transmitting large powers with efficiency and reliability. The invention further consists in the provision of improved cooling means and in means for preventing leakage.

A further object of my invention consists therein that an efficient cooling by air is provided for the friction discs of the coupling for the purpose of properly dissipating the heat which is generated in slipping condition of the coupling. In the first place according to this invention the two frictional coverings or groups of laminæ do not contact with each other along their entire faces, this being accomplished by dividing said surfaces into a great number of isles, which may be effectively touched on all of their sides by the cooling air. The effect of suction exerted on the cooling air will be greatly enhanced by the channels which are provided between said several isles. Air is supplied to the laminæ of the friction-coupling by further amply dimensioned channels so that no stowing-up of the air can take place in said channels. For this purpose the hub of the respective coupling member is provided with extensions of T-shaped cross-sectional conformation. From here the air will be supplied to the frictional coverings or laminæ of the coupling in even quantities in accordance with the uniform conditions of resistance existing at said frictional coverings or laminæ.

Figure 1:
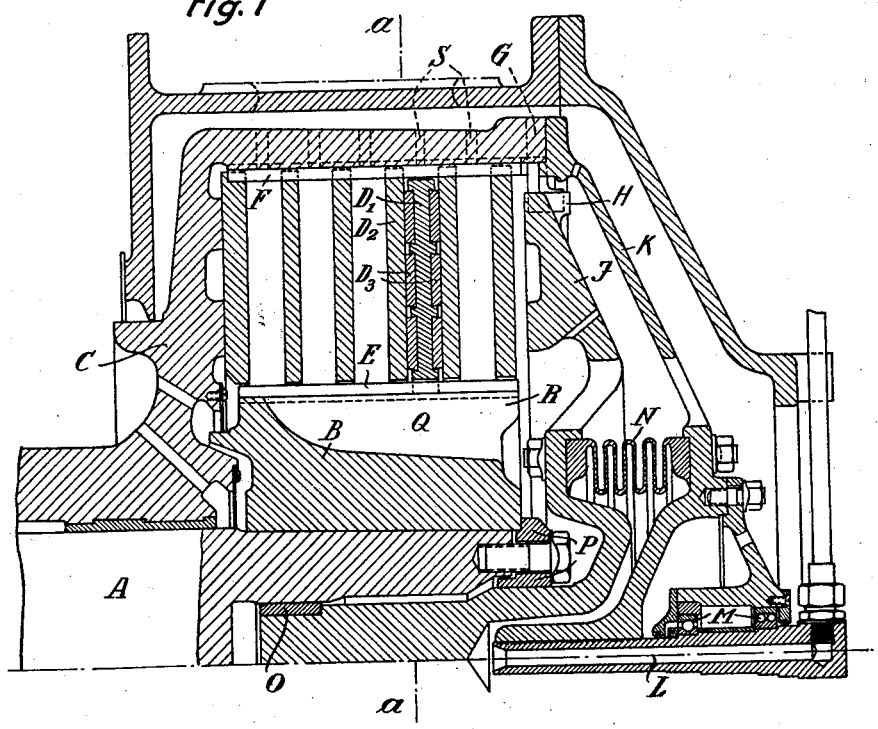
Figure 2:
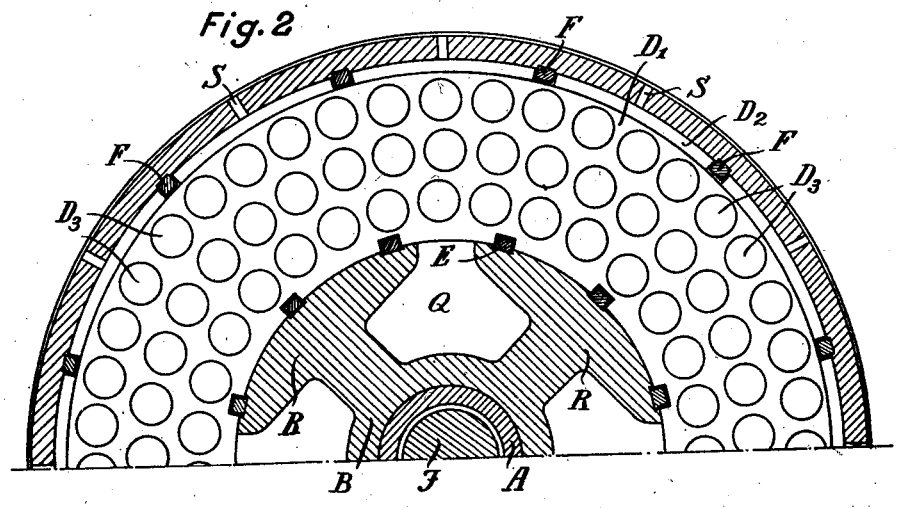

The accompanying drawing represents an example of the construction of the pneumatic friction-coupling according to this invention. In the drawings Fig. 1 is a longitudinal section through the new coupling, while Fig. 2 is a cross-section taken along the line $a$—$a$ of Fig. 1.

Referring now more particularly to the drawings, A is a shaft to which the hub B of one of the members of the coupling is keyed, said hub carrying the one group of laminæ $D_1$. Keys E are provided in order to prevent rotation of said laminæ around the hub B. The hub C with the bell-shaped extension is loosely mounted on the shaft A and after throwing-in the coupling the said hub will rotate together with said shaft. The laminæ $D_2$ of the other group are prevented from rotating within said bell-shaped extension by means of keys F. Both groups of laminæ $D_1$ and $D_2$ are enclosed by the bell-shaped extension of the hub C. A ring is connected to said hub C, which by means of projecting parts H engaging with proper recesses provided in the pressure plate J will serve as a guide for the latter. The bell-shaped extension of the hub C is furthermore provided with an arched lateral wall or plate K forming a bearing for the tube L which serves for supplying pressure air to the coupling, said bearing comprising furthermore two ball-bearings M. The tube L is kept fixed, and the said bearing is rotatable together with the bell-shaped clutch member C. The bore surface of the hub of the plate K and the coacting exterior surface of the tube L are provided with recesses which contain a packing medium such as oil. The pressure air is fed through the tube L to an expansible annular pressure chamber the side walls of which are formed by the plates J and K and the outer wall of which consists of an expansible corrugated tube N the two ends of which are tightly connected with the plates J and K. The tube L communicating with the annular pressure chamber is axially arranged to said chamber which is held tightly closed by the packing means at the junction of the tube L and the hub of the plate K. By action of the air-pressure the pressure plate J will be moved towards the laminæ $D_1$ and $D_2$, said membrane N at the same time being expanded in the direction of the axis of the shaft A. The two slide bearings O and P will now serve to guide the pressure plate J during such motion, said bearings being provided within the shaft A at a proper distance from each other, in order to more properly guide said pressure plate without permitting "tipping" of the latter. As the pressure plate J is moved in axial direction, the shaft A rotates relatively to the bell-shaped extension of the hub C and therewith also relatively to the pressure plate J which is prevented from rotation by the projections H. The friction taking place in the two bearings O and P will therefore be very small. For carrying back the pressure plate J into its original positions after removal of the pressure air and for disengaging the coupling, the spring action of the membrane N will be sufficient. In order to reduce the weight of the pressure plate J the latter is made, as above indicated, of conical form, this form simultaneously providing for sufficient rigidity of said pressure plate.

It is important to provide an efficient cooling for the frictional members of the coupling, in order to keep the same permanently in good working condition and in order to avoid the production of excessive heat in case of frequently repeated slipping of the coupling. This is effected by the channels Q which are provided on the hub B the cross-section of these channels being shown in Fig. 2. By these channels T-shaped extensions or spokes R will be produced on said hub B. The air flows through the recesses in plate J into the channels Q and then radially outward through the clutch plates. The channels Q are made of relatively large cross-section thus permitting the pressure-air to be uniformly distributed over all laminæ D₁ and D₂. The air which is carried to said laminæ will be caused to whirl about the shaft A and to be thrown in outward direction by centrifugal force. The air will be effectively distributed and carried into the interstices between the several laminæ D₁ and D₂. As the additional frictional members D₃ forming part of the laminæ D₁ consist of cylindrical pieces which, as may be seen from Fig. 2, are pressed into apertures provided in the laminæ D₁, the two groups of laminæ will not perfectly and tightly engage with each other, even in case the coupling is thrown in; air may therefore always pass around said laminæ and provide an effective cooling for the latter. On the other hand the interstices which are provided between the laminæ will contribute to enhance the effect of suction exerted on the cooling air. The air may pass to the outside of the coupling through apertures S provided on the bell-shaped extension of the hub C.

I claim:

1. In a pneumatic friction clutch the combination of a driving member, a coaxial driven member, each of said members carrying a set of friction discs, a centrally arranged and axially displaceable pressure-plate adapted to bring the sets of friction discs into frictional engagement with each other, said pressure-plate forming one side wall of a tight pressure-chamber, a centrally arranged and axially immovable plate forming the other side wall, a longitudinally expansible corrugated tube of relatively small diameter forming the outer wall of the said pressure-chamber, and apertures in the said pressure-plate, on the outside of the pressure-chamber, such apertures leading cooling air to the discs.

2. In a pneumatic friction clutch the combination of a shaft, a bell-shaped clutch-member rotatably mounted on said shaft, a second clutch-member fast on said shaft, each of said members carrying a set of friction discs, a centrally arranged plate fixed to the flange of the said bell-shaped clutch-member and forming a side wall of a pressure-chamber, an axially displaceable actuating pressure-plate forming the other side wall, a longitudinally expansible corrugated tube of relatively small diameter forming the outer wall of said pressure-chamber, and apertures in the said two plates, on the outside of the pressure-chamber, such apertures leading cooling air to the friction discs.

3. In a pneumatic friction clutch the combination of a shaft, a bell-shaped clutch-member rotatably mounted on said shaft, a second hub-like clutch member fast on said shaft, each of said members carrying a set of friction discs, a centrally arranged plate fixed to the flange of the bell-shaped clutch member and forming a side wall of an expansible pressure-chamber, an axially displaceable actuating pressure-plate forming the other side wall and an axially expansible corrugated tube of relatively small diameter forming the outer wall of said pressure-chamber, and apertures in the said two plates, on the outside of the pressure-chamber, such apertures communicating with cavities in the said hub-like clutch member to lead cooling air to the friction discs.

4. In a pneumatic friction clutch the combination of a shaft, a bell-shaped clutch member rotatably mounted on said shaft, a second hub-like clutch member fast on said shaft, each of said members carrying a set of friction discs, a centrally arranged plate fixed to the flange of the bell-shaped clutch member and forming a side wall of an expansible pressure-chamber, an axially displaceable actuating pressure-plate forming the other side wall and an axially expansible corrugated tube of relatively small diameter forming the outer wall of said pressure-chamber, and apertures in the said two plates, on the outside of the pressure-chamber, such apertures communicating with air ducts provided between adjacent friction discs through the intermediary of cavities in the said hub-like clutch member.

5. In a pneumatic friction clutch the combination of a shaft, a bell-shaped clutch member rotatably mounted on said shaft, a second hub-like clutch member fast on said shaft, each of said members carrying a set of friction discs, a centrally arranged plate fixed to the flange of the bell-shaped clutch member and forming a side wall of an expansible pressure-chamber, an axially expansible corrugated tube forming the outer wall and an axially displaceable actuating pressure-plate forming the other side wall of said pressure-chamber, the said pressure-plate having a central extension guided in a central bore of the said shaft.

6. In a pneumatic friction clutch the combination of a shaft, a bell-shaped clutch-member rotatably mounted on said shaft, a second clutch-member fast on said shaft, each of said members carrying a set of friction discs, a centrally arranged and axially immovable plate fixed to the flange of the said bell-shaped clutch-member and forming a side wall of a pressure-chamber, an axially displaceable actuating pressure-plate forming the other side wall, a longitudinally expansible corrugated tube of relatively small diameter forming the outer wall of said pressure-chamber, a pressure-air supply tube leading through a central hub of the said axially immovable plate, and packing means provided between said hub and said tube.

7. In a pneumatic friction clutch the combination of a shaft, a bell-shaped clutch-member rotatably mounted on said shaft, a second clutch-member fast on said shaft, each of said members carrying a set of friction discs, a centrally arranged and axially immovable plate fixed to the flange of the said bell-shaped clutch-member and forming a side wall of a pressure-chamber, an axially displaceable actuating pressure-plate forming the other side wall, a longitudinally expansible corrugated tube of relatively small diameter forming the outer wall of said pressure-chamber, a pressure-air supply tube leading through a central hub of the axially immovable plate, packing means provided between said hub and said tube, and an additional bearing for the supply tube, said bearing being positioned on the outside of the labyrinth-packing.

8. In a pneumatic friction clutch the combination of a shaft, a bell-shaped clutch-member rotatably mounted on said shaft, a second hub-like clutch member fast on said shaft, a centrally arranged plate fixed to the flange of the said bell-shaped clutch member and forming an axially immovable side wall of an axially expansible pressure-chamber, a pressure-air supply tube leading through a central hub of the said axially immovable side wall, and packing means provided between said hub and said tube.

9. In a pneumatic friction clutch the combination of a shaft, a bell-shaped clutch member rotatably mounted on said shaft, a second hub-like clutch member fast on said shaft, a centrally arranged plate fixed to the flange of the said bell-shaped clutch member and forming an axially immovable side wall of an axially expansible pressure-chamber, a pressure-air supply tube leading through a central hub of the said axially immovable side wall, packing means provided between said hub and said tube and an additional bearing for the supply tube, said bearing being positioned on the outside of the packing means.

In testimony whereof I affix my signature.

WALTHER LINDNER.